May 26, 1970   C. A. DE MERITT ET AL   3,514,001
FREIGHT PALLET CARRIER

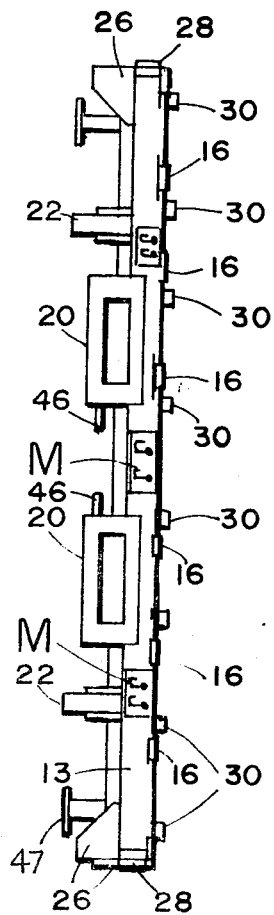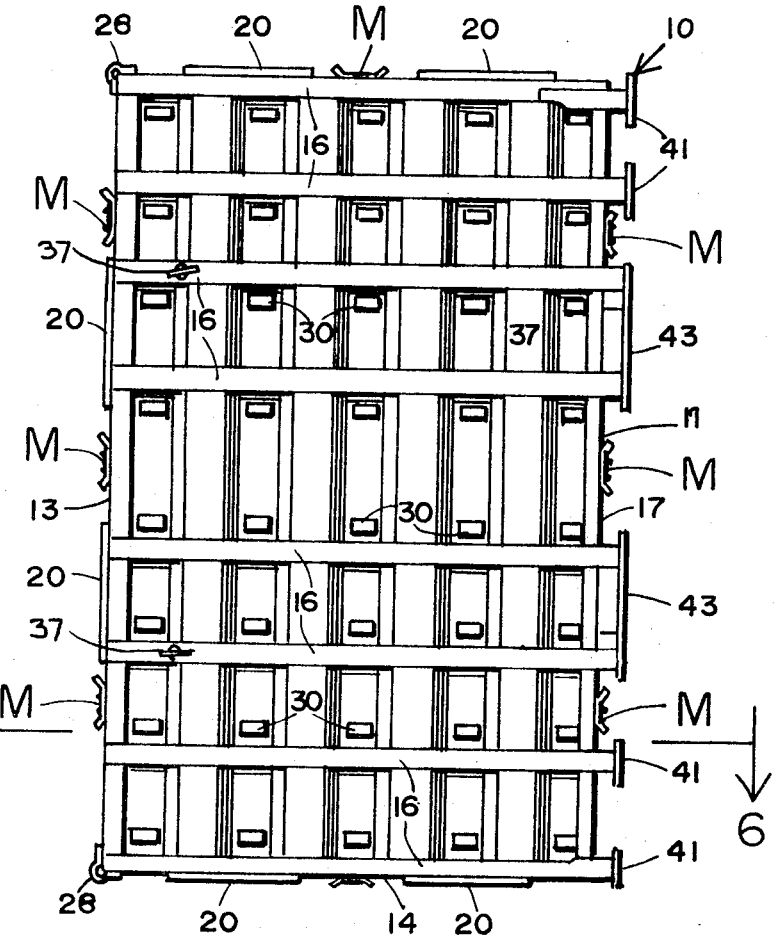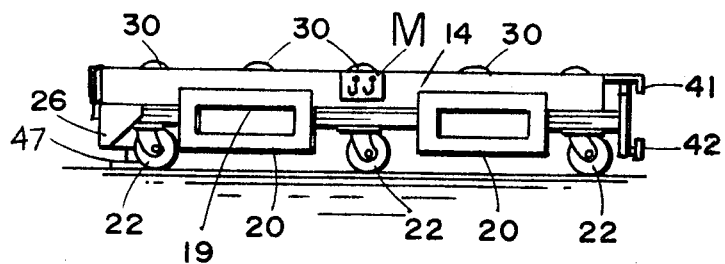

Filed Aug. 20, 1968   3 Sheets-Sheet 2

INVENTORS
CLIFFORD A. DeMERITT
EDWARD E. BRUSH
BY Salvatore G. Militano
attorney INVENTORS
CLIFFORD A. DeMERITT
EDWARD E. BRUSH United States Patent Office 3,514,001
Patented May 26, 1970

3,514,001
FREIGHT PALLET CARRIER
Clifford A. De Meritt, Miami, and Edward E. Brush, Coral Gables, Fla., assignors to Jet-Avion Corp., Hialeah, Fla., a corporation of Florida
Filed Aug. 20, 1968, Ser. No. 754,084
Int. Cl. B66f 9/12; B60p 1/00
U.S. Cl. 214—620
3 Claims

ABSTRACT OF THE DISCLOSURE

A multi-purpose pallet carrier for aircraft which may be used as a unit, or bolted in pairs or in sequence as a conveyor for receiving pallets thereon having a plate member consisting of alternate hills and valleys extending from one side to the other with a plurality of casters mounted in the lower surface of the valleys and smaller casters mounted on the upper surface of the valleys, reinforcing members secured to the plate member consisting of elongated straps secured to the top surfaces of the hills and extending from the front to the rear of the plate member and of enlarged channels extending from the front to the rear and from side to side where not interrupted by the first named channels, all the channels being secured to the lower surface of the valleys and having fork lift windows mounted on the ends of the channels, connecting plates mounted on the ends of the elongated straps and enlarged channels at the rear of the plate member, and a plurality of adjustable stop members mounted on the pallet carrier along the edge portions to secure pallet containing freight on the pallet.

―――――――

Figures 2, 5:
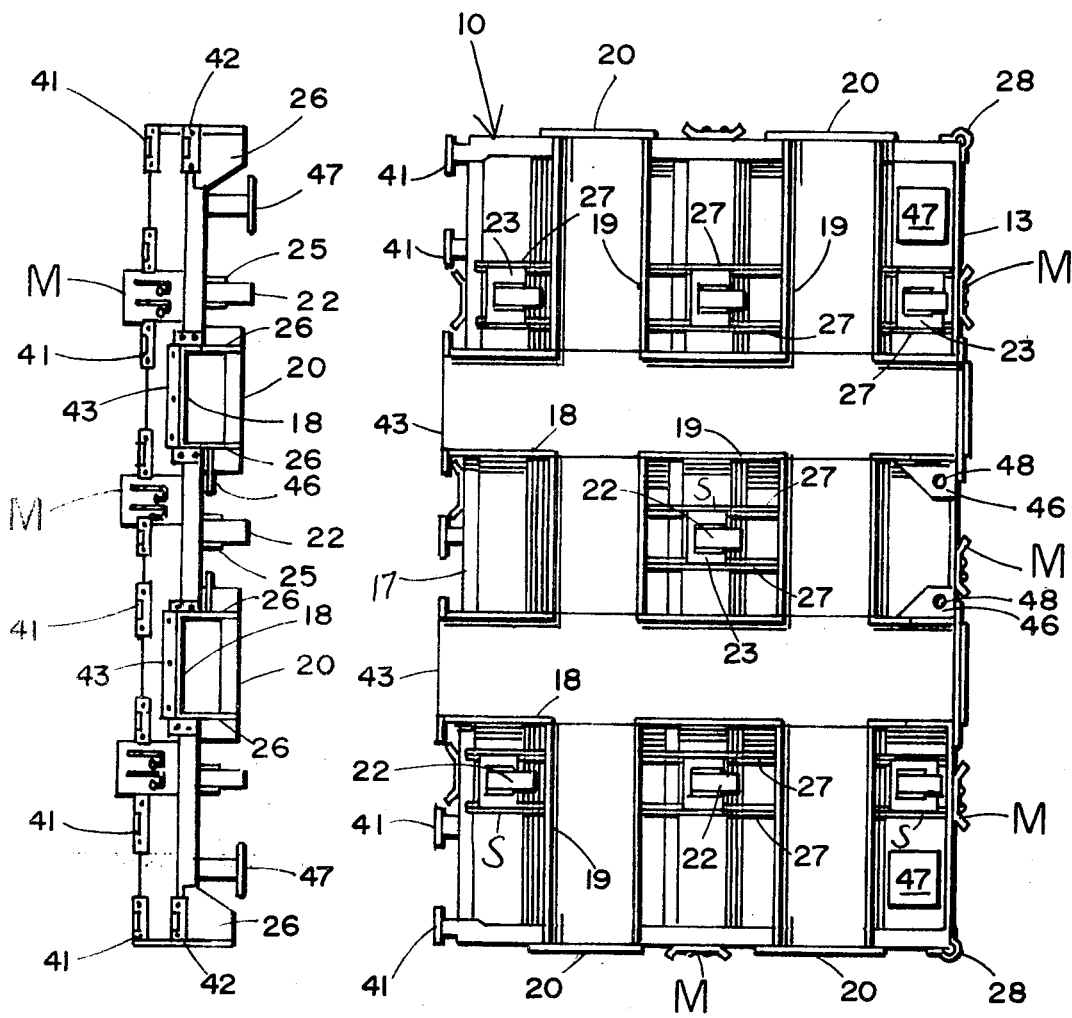

This invention relates to freight pallet carriers and is more particularly directed to a multi-purpose pallet carrier for aircraft.

A principal object of the present invention is to provide a pallet carrier which can be used as a conveyor, a transporter, a loader and a work station in the transportation of freight by pallets.

Another object of the present invention is to provide pallet carriers used as a unit or which can be locked together to form an enlarged single carrier or dolly.

A further object of the present invention is to provide pallet carriers that can be arranged in sequence to form a freight conveyor.

A further object of the present invention is to provide a slave pallet which can be loaded with a freight pallet and then lifted by a lift truck and carried to an aircraft or truck for loading the freight thereon.

A still further object of the present invention is to provide a multi-purpose pallet carrier which is capable of carrying large amounts of freight yet is light in weight and exceedingly strong by use of corrugated sheet steel as its body portion reinforced with steel channels and steel straps.

With these and other objects in view, the invention will be best understood from a consideration of the following detailed description taken in connection with the accompanying drawings forming a part of this specification, with the understanding, however, that the invention is not confined to any strict conformity with the showing of the drawings but ma be changed or modified so long as such drawings but may be changed or modified so long as such the salient features of the invention as expressed in the appended claims.

In the drawings:

FIGS. 1 and 2 are top and bottom plan views respectively of a multi-purpose pallet carrier for aircraft constructed in accordance with our invention.

Figure 6:
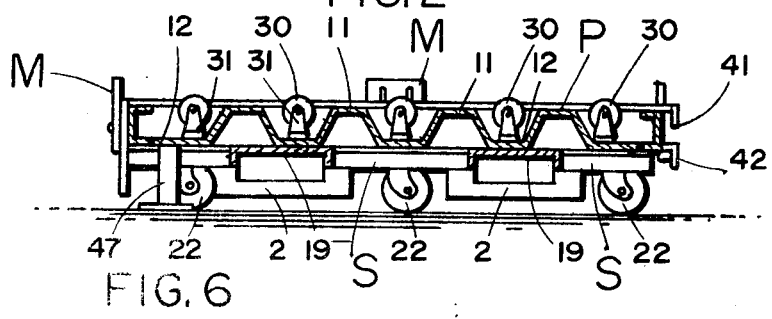
Figure 8:
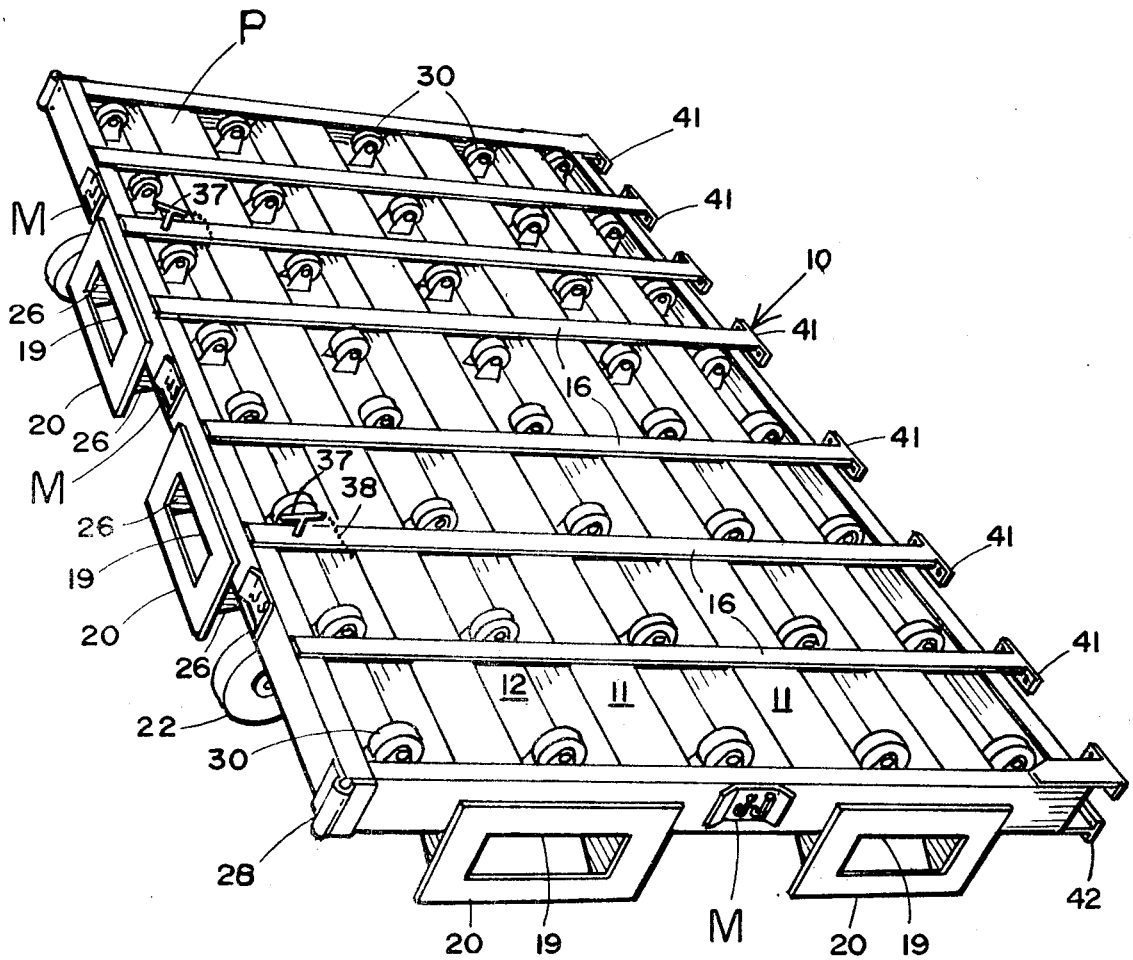
Figure 7:
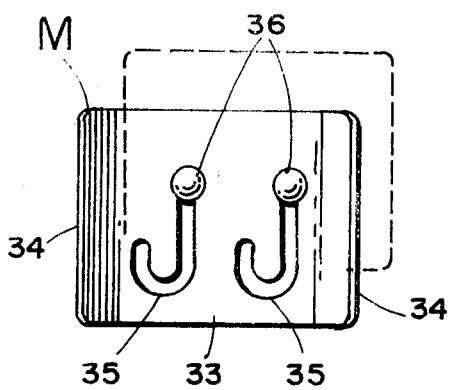

FIG. 3 is an end elevational view.
FIG. 4 is a front elevational view.
FIG. 5 is a rear elevational view.
FIG. 6 is a cross sectional view taken along the line 6—6 of FIG. 1.
FIG. 7 is an elevational view of a stop member in its lowered position, the dotted lines indicating its upper position to prevent movement of a freight pallet in the carrier.
FIG. 8 is a perspective view of our pallet carrier.

Referring to the drawings wherein like numerals are used to designate similar parts throughout the several views, the numeral 10 refers to our multi-purpose pallet carrier consisting of a structural steel platform formed of a steel plate member P shaped in alternate hills 11 and valleys 12. The plate member P is reinforced by channel members 13, 14, 15 and 17 welded along the front edge, the two sides and rear edge, respectively with a plurality of equally spaced reinforcing flat straps 16 extending from the front to the rear edges and welded to the hills 11 of the steel plate member P. The flat straps 16 extend beyond the rear edge 17 of the plate member P as shown by FIG. 1. A pair of wide channels 18 that likewise extend from the front to the rear of the steel plate member P are welded to the lower surface of the valleys 12. The wide channels 18 are spaced approximately equally from the longitudinal center-line of the pallet 10 as well as from the side edges 14 and 15. At the front ends of the wide channels 18, there is a rectangular metal frame 20 forming a fork lift window welded thereto. At the sides 14 and 15 of the plate member P is another pair of fork lift windows 20 welded to the free ends of wide channel bars 19 welded to the lower surface of the valleys 12 and extending along the full surface of the plate member P except where interrupted by the longitudinal channels 18. The wide channels 19 extend to and between the wide channels 18 where they are welded together.

To reinforce the fork lift windows 20 against becoming bent by a fork lift that may strike the frame as it attempts to be received by the windows 20, gussets 26 are welded on behind the windows 20 on each side thereof and below the channels 18, 19.

On both sides of the front fork lift windows 20 and at the center of the carrier 10 are seven base supports S for rollers 22 totaling 7 casters 22 which support the carrier 10. Each of the supports S consist of angles 27 welded to the lower surface of the valleys 22 and to plate P and a plate member 24 extending between and welded to the angles 27. The casters 22 are conventional in construction having swivelled supports 23 bolted to the angles 27. Bumpers 28 are mounted at the two forward corners of the carrier 10 to prevent injury to an object struck by the carrier 10 as it is moved with a load of pallets thereto.

The pallet carrier 10 is provided with a plurality of swivel casters 30 which extend upwardly being mounted on the upper surfaces of the valleys 12. The casters 30 are equally spaced and symmetrically disposed on the pallet carrier 10 so as to uniformly support and permit pallets loaded with freight to slide thereon. The casters 30 are of conventional construction, supported on supports 31 that are pivotally bolted to the valley 12.

To prevent the dislodgement of any freight carrying pallets placed on the pallet 10 there are mounted along the front, rear and sides of the pallet 10 movable stops M consisting of a plate member 33 whose ends 34 are flared outwardly for easy manipulation. The plate member 33 is provided with a pair of slots 35 having a J configuration through which extends bolts 36. The movable stop members M may be slidably positioned in one of two positions, namely, the upper or stop position or the lower or non-operative position. When the stop member M is in its upper position, the bolts 36 will have slid downwardly to the lower end of the slot 35. The stop member M will then extend above the rollers 30, as shown by the dotted position in FIG. 7, to prevent any pallet resting on the rollers 30 from rolling off the pallet 10. When the stop member M is in its lowermost position, the bolts 36 will have slid to the upper ends of the slots 36 and the plate 33 will lie below the level of the rollers 30 to permit the pallets resting on the rollers 30 to slide thereon without obstruction.

In addition to the stop members M there are a pair of belaying pins 37 secured by a line 38 adjacent the front edge 13 of the pallet 10. A hole 39 is formed on a plate 40 to receive the belaying pin 37 when it is desired to secure a pallet of freight positioned thereon. The end of the line 38 is secured to the plate member P in order to prevent loss of the belaying pin 37 when not in use. When pallets being carried by the carrier 10 do not extend the full length of the carrier 10, the belaying pins 37 are used to maintain the pallets on the carrier 10.

In order to permit locking two plates 10 together, a plurality of locking plates 41, 42, 43 are provided on the rear side 17. Secured to the ends of the flat reinforcing bars 16 whose rear end portions extend beyond the rear edge 17 are locking plates 41, all of which are provided with a pair of bores 44 for receiving bolts (not shown). Below the end locking plates 41 at the side edges of the pallet 10 is a further locking plate 42 likewise having a pair of bolt holes 44 for receiving bolts to lock the pallets 10 together. At the ends of the pair of wide channel members 18 is a U-shaped locking plate 43 welded thereto. The locking plates 43 are provided with bores 45 for receiving bolts extending from a similar locking plate 43 on a companion pallet carrier 10 for locking a pair of carriers 10 together. It is to be noted that by virtue of the locking plates 41, 42, 43 being mounted in spaced relation to the rear edge 17 of the carrier 10, the bolting together a pair of carriers 10 becomes readily accomplished by merely inserting the bolts from the top side of the carriers 10 even as to the lower locking plates 32, 43.

A pair of towing plates 46 having openings 48 for receiving a towing bar are mounted on the forward edge 13 of the carrier 10 as shown by FIG. 2; the towing plates 46 lie horizontally equally distant from the center line of the carrier 10 and welded to gussets 26.

A pair of conventional floor engaging stop or floor locks 47 are secured to the lower surface of the panel P adjacent the forward edge 13 (see FIGS. 2 and 6). The floor locks 47 are used to prevent the carrier 10 from rolling or moving when such is desired.

From the above description taken in connection with the accompanying drawings, the multi-purpose carrier 10 may be used as a single unit or in a pair locked together to form a large carrier. A number of single or mated units may be arranged in a line as a stationary conveyor for rolling freight thereon. Also, the multi-purpose carrier 10 may be used as a slave pallet upon which pallets containing freight may be positioned for transporting the freight from one place to another. The pallet carriers 10 may be lifted by a lift truck in loading or unloading cargo in an aircraft or truck. The multi-purpose pallet carriers 10 may also be used as a work station to make up palletized shipments and separate cargo shipments.

What we claim as new and desire to secure by Letters Patent is:

1. A multi-purpose pallet carrier for aircraft comprising a plate member having a plurality of alternate hills and valleys extending from one side to the other, a reinforcing channel secured about the perimeter of said plate member, spaced reinforcing means extending from the front to the rear of said plate member, said reinforcing means being secured to the lower surface of said valleys and the upper surface of said hills, a plurality of swivelled casters mounted on the lower and upper surfaces of said valleys and extending beyond the adjacent hills, a plurality of adjustable stop means mounted on said reinforcing channel members, fork lift window members mounted on the ends of said reinforcing means at the front and sides of said plate member at said reinforcing channel members and plate connecting members mounted on the rear ends of said spaced reinforcing means whereby said carrier may be selectively used as a unit or bolted to another of said carriers to form an enlarged carrier or arranged in sequence to form a conveyor.

2. The structure as recited by claim 1 wherein said spaced reinforcing means secured to the lower surfaces of said valleys comprise enlarged channels and said spaced reinforcing means secured to the upper surface of said hills comprise elongated steel members.

3. The structure as recited by claim 1 wherein said adjustable stop means comprise a plate having a pair of spaced and substantially parallel slots of J-shaped configuration, a pair of pins mounted on said reinforcing channel members and received by said slots whereby upon sliding said plate upwardly and positioning said pins in the lower portion of said slots, said plate will extend above said casters and upon positioning said pins in the upper portion of said slots, said plate will lie below the top portion of said casters.

References Cited
UNITED STATES PATENTS

| 1,797,626 | 3/1931 | Von Reis | 193—35 |
| 2,346,659 | 4/1944 | Bruce. | |
| 2,813,642 | 11/1957 | Fisher | 214—84 |
| 2,932,527 | 4/1960 | Payne. | |
| 3,113,532 | 12/1963 | White | 108—58 X |
| 3,243,062 | 3/1966 | Frassetto | 214—84 |

FOREIGN PATENTS 490,446   2/1953   Canada.

ROBERT G. SHERIDAN, Primary Examiner

R. J. SPAR, Assistant Examiner

U.S. Cl. X.R.

193—35; 214—84; 280—79.1